A. Wyckoff,
Wood Molding Machine.
Nº 31,509. Patented Feb. 19, 1861.
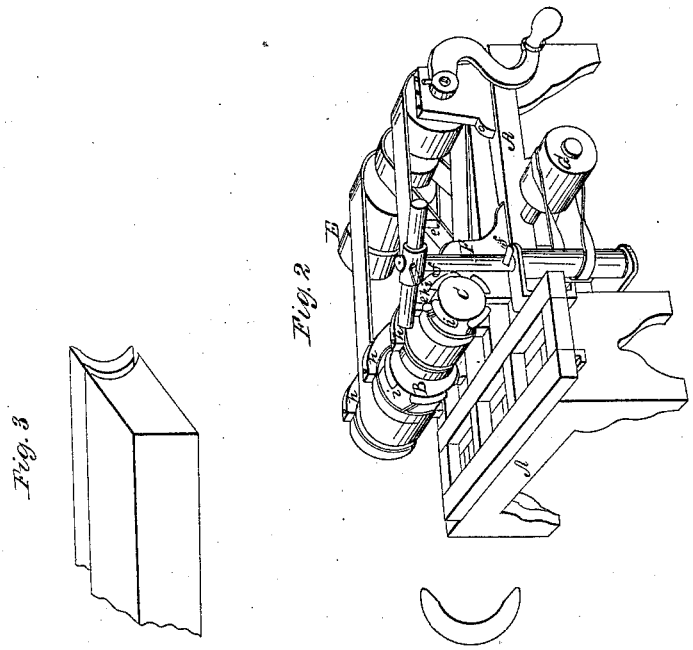
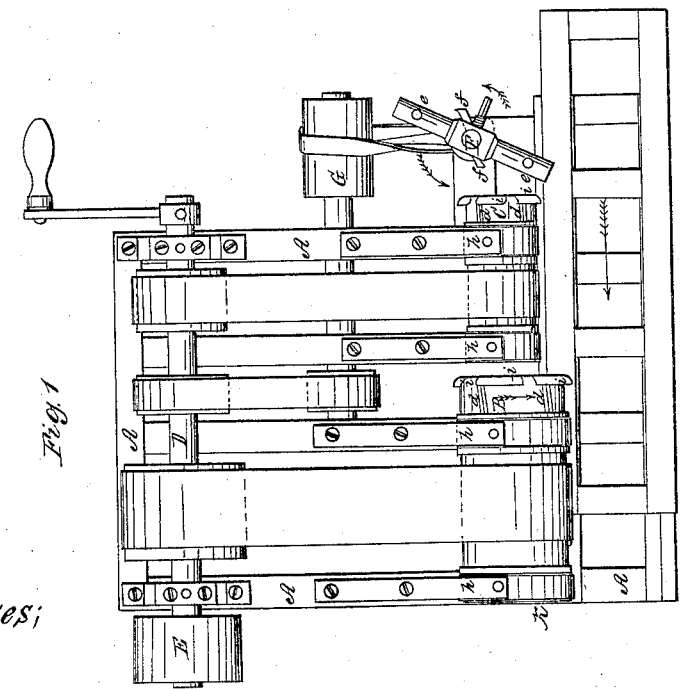
Witnesses:
S. J. Allis
James Jones
Inventor:
A. Wyckoff
by his attorney J. Fraser

UNITED STATES PATENT OFFICE.

ARCALOUS WYCKOFF, OF ELMIRA, NEW YORK.

MACHINE FOR CUTTING WOODEN TROUGHS.

Specification of Letters Patent No. 31,509, dated February 19, 1861.

*To all whom it may concern:*

Be it known that I, ARCALOUS WYCKOFF, of Elmira, in the county of Chemung and State of New York, have invented a new and Improved Machine for Making Wooden Troughs; and I do hereby declare that the following is a full and exact description thereof, reference being had to the accompanying drawings, in which—

Figure 1, is a plan view of my machine; Fig. 2, is a general view in perspective; Fig. 3, represents a piece of timber with a trough partly cut therefrom.

Similar letters indicate corresponding parts in all of the figures.

The object of my invention is the production of troughs for the eaves of houses, gutters, and other similar purposes, by cutting them rapidly from planks of suitable thickness, and leaving them with all of the finish ordinarily required for use.

As represented in the drawings, A, A, is the frame or table which supports the operating parts of the machine. These parts consist of two cylindrical cutters of different diameters; the larger, B, forming the outer side of the trough, and separating it from the plank, and the smaller, C, forming the inner, or concave side, which has a curve of less radius than the outer side. These cylinders are situated so as to turn concentrically, or so that their axes are in the same straight line and are driven by bands from the driving shaft D, the power being applied to the pulley E. Rotary edge cutters, or trimmers, are attached to arms on the vertical shaft F; those marked $e$, $e$, cutting the upper side of the trough, as it is formed, so as to insure uniform width to each, while $f$, $f$, trim the edges to produce a like result. The shaft, F, runs in horizontal bearings attached to the side of the frame A, and is driven by a band from the pulley G, which receives its motion from the driving shaft D, by means of a band and pulleys.

The cylindrical cutters consist of annular heads provided with a series of cutting edges, or lips, $i$, $i$, arranged at equal distances around the annulus, with spaces, or throats, for the passage of the chips between them. These cutters are constructed on principles approximating very closely to the cutter-head of my annular boring machine, patented July 12th 1859; but the provision for removing the chips is different, consisting of wings, or flanges, $d$, $d$, placed immediately behind the cutters, generally in a direction somewhat oblique to that of the cylinders. They project from the cylinder an equal distance with the cutters $i$ $i$, and sweep the chips before them until they are carried out of the kerf formed by the cutters. And they respectively extend backward from the heels of the cutting edges $i$, $i$, so that the chips, as soon as made, may be immediately moved behind said cutting edges, and lodge against said flanges till swept from the kerf, at each revolution of the cutter cylinder. Thus the cutting edges, and the throats between the same are kept unobstructed, and there is no accumulation of chips in the kerf, to waste the power of the machine.

The cylinder runs in shallow boxes $h$ $h$ which project no farther on the working side of the cylinder than the cutting parts do; flanges being provided on each side to prevent it from moving lengthwise, and to retain the oil in the bearings and exclude dust. A carriage H, slides on ways in front of the cylinders, and to this the plank, of a suitable thickness, is secured by clamping, or otherwise held, and moved along in front of the cutters as fast as they will operate to advantage. The edge cutters first take effect, when the small cylinder, C, cuts the concave side of the trough, leaving a core or section from the interior of the trough, which passes through the cylinders and is discharged from the machine at K. The large cylinder B, separates the trough from the plank, and it also, is discharged in a finished state through the cylinder at K. The carriage is then brought back, the plank moved forward the thickness of another trough, and the operation is repeated. In this and the successive troughs till the plank is used up, the small cylinder C, has only to remove a small portion of the wood from the bottom, to deepen it; which is left in a thin strip, of crescent shape, which is highly useful for other purposes, such as battens for buildings, roofs, &c. Both cylinders finish the surfaces which they cut smoothly, leaving no rough places to retain water and occasion premature decay.

The machine works with rapidity, and makes but very little waste of material, as will be observed by the sectional view of the plank, and the completed trough in Fig. 3.

I am aware that a single annular saw, or cutter, has been employed for grooving gutters, and, at the same time, for saving the core cut therefrom, to be hollowed in the same operation, for some useful purpose; but such an invention can neither cut two or more gutters from one piece of plank or scantling, nor finish the outside, as well as the inside, of the gutter, nor utilize a portion of the core taken from one gutter to furnish a part of the material of the next gutter cut from the timber.

What I claim as my invention and desire to secure by Letters Patent is—

1. The combination and arrangement of two annular cutters, or cutting cylinders, B, C, one being of larger diameter than the other, and both cutting concentrically, for the purpose of forming a succession of gutters, or eaves-troughs, finished inside and outside, from each piece of plank or scantling, the outer portion of one being taken from the core of the next, while a crescent-shaped piece is sawed, between the kerfs of the two cutters, to be utilized, substantially as herein specified.

2. In combination with the described cylindrical cutters B, C, edge cutters and trimmers $e, e$, and $f, f$, arranged substantially in the manner and for the purposes shown and described.

3. The arrangement of the wings or flanges $d, d$, extending back upon the cutting cylinders, from the heels of the cutting edges $i, i$, in combination with said cutting edges, so as to keep the same and the throats between them immediately and continually unobstructed by the chips as fast as formed, substantially as specified.

ARCALOUS WYCKOFF.

Witnesses:
J. FRASER,
S. J. ALLIS.